United States Patent
Savaëte et al.

(10) Patent No.: US 10,832,512 B2
(45) Date of Patent: Nov. 10, 2020

(54) RESOURCE DELIVERY

(71) Applicant: CityTaps SAS, Sèvres (FR)

(72) Inventors: Laurent Savaëte, Bergerac (FR);
Grégoire Auguste Landel, Sèvres (FR);
Miranda Phua, Maribyrnong (AU)

(73) Assignee: CityTaps SAS, Sèvres (FR)

( * ) Notice: Subject to any disclaimer, the term of this patent is extended or adjusted under 35 U.S.C. 154(b) by 94 days.

(21) Appl. No.: 15/235,729

(22) Filed: Aug. 12, 2016

(65) Prior Publication Data

US 2017/0061727 A1 Mar. 2, 2017

Related U.S. Application Data

(60) Provisional application No. 62/210,541, filed on Aug. 27, 2015.

(51) Int. Cl.
*G07F 13/02* (2006.01)
*H04L 29/08* (2006.01)
(Continued)

(52) U.S. Cl.
CPC ............. *G07F 13/02* (2013.01); *G06Q 20/14* (2013.01); *G06Q 20/28* (2013.01); *G06Q 20/3226* (2013.01); *G06Q 20/405* (2013.01); *G06Q 50/06* (2013.01); *G07F 15/06* (2013.01); *H04B 1/3833* (2013.01); *H04L 67/12* (2013.01); *H04W 88/16* (2013.01)

(58) Field of Classification Search
CPC ......... A01G 25/16; G01W 1/10; G06Q 10/00; G01D 4/00; G01F 15/00; G07F 9/026

USPC .................................................. 700/282–284
See application file for complete search history.

(56) References Cited

U.S. PATENT DOCUMENTS

| 5,409,094 A | * | 4/1995 | Muraco | G07F 13/02 |
| | | | | 194/317 |
| 5,769,269 A | * | 6/1998 | Peters | G06Q 20/123 |
| | | | | 221/7 |

(Continued)

FOREIGN PATENT DOCUMENTS

| OA | 12 679 | 6/2006 |
| WO | WO 1999/42963 | 8/1999 |

OTHER PUBLICATIONS

International Search and Written Opinion; PCT/EP2016/069284; dated Jan. 3, 2017; 17 pages.

(Continued)

*Primary Examiner* — Daniel S Felten
(74) *Attorney, Agent, or Firm* — Fish & Richardson P.C.

(57) ABSTRACT

Methods, systems, and apparatus, including computer programs encoded on a computer storage medium, for delivering resources. The methods, systems, and apparatus include actions of based on measurements of amounts of a resource that are delivered from one or more supply outlets against amounts of value of electronic prepayments that have been authorized by corresponding users of mobile devices for the delivery of the resource at the one or more supply outlets, causing the one or more supply outlets to enable delivery of the resource in aggregate amounts that are not outside amounts of value of electronic prepayments that have been authorized by the corresponding users of mobile devices for the delivery of the resource.

22 Claims, 5 Drawing Sheets (51) Int. Cl.
*H04W 88/16* (2009.01)
*H04B 1/3827* (2015.01)
*G06Q 20/28* (2012.01)
*G06Q 50/06* (2012.01)
*G06Q 20/32* (2012.01)
*G06Q 20/40* (2012.01)
*G07F 15/06* (2006.01)
*G06Q 20/14* (2012.01)

(56) References Cited

U.S. PATENT DOCUMENTS

| | | | | |
|---|---|---|---|---|
| 5,864,620 | A * | 1/1999 | Pettitt | G06F 21/10 |
| | | | | 705/320 |
| 5,892,900 | A * | 4/1999 | Ginter | G06F 21/10 |
| | | | | 726/26 |
| 5,933,497 | A * | 8/1999 | Beetcher | G06F 21/121 |
| | | | | 705/59 |
| 5,949,876 | A * | 9/1999 | Ginter | G06F 21/10 |
| | | | | 348/E5.006 |
| 6,895,394 | B1 * | 5/2005 | Kremer | G06Q 20/02 |
| | | | | 705/64 |
| 8,769,289 | B1 * | 7/2014 | Kronrod | G06F 21/43 |
| | | | | 380/285 |
| 9,049,821 | B1 | 6/2015 | Hanna | |
| 9,727,850 | B2 * | 8/2017 | Severson | G06Q 20/04 |
| 9,842,332 | B2 * | 12/2017 | Richardson | G06Q 20/3276 |
| 2007/0178883 | A1 * | 8/2007 | Nandagopal | G06Q 20/32 |
| | | | | 455/411 |
| 2009/0307116 | A1 | 12/2009 | Al-Harbi | |
| 2012/0191242 | A1 * | 7/2012 | Outwater | G06Q 30/06 |
| | | | | 700/236 |
| 2014/0142748 | A1 * | 5/2014 | Geigel | G07F 9/026 |
| | | | | 700/237 |
| 2014/0239521 | A1 * | 8/2014 | Ergican | B67D 1/0058 |
| | | | | 261/115 |
| 2014/0263630 | A1 * | 9/2014 | Richardson | G06Q 20/3276 |
| | | | | 235/381 |
| 2015/0356809 | A1 * | 12/2015 | Carroll | G07F 11/70 |
| | | | | 700/236 |

OTHER PUBLICATIONS

Prepaid Water Meter Device; Laisontech.com; http://www.laisontech.com retrieved on Jul. 24, 2017.

AP Office Action in African Appln. No. 2018-010594, dated Feb. 18, 2020, 4 pages.

Baylanwatermeters.com [online]. Products; 2018 (retrieved Mar. 2, 2020). Retrieved from the Internet: http://baylanwatermeters.com/en/products_en.php?cat-8#product-cat-8 ; 24 pages.

Citiqprepaid.co.za [online]; Products, 2018 (retrieved Mar. 2, 2020). Retrieved from the Internet: https://www.citiqprepaid.co.za/product/utility-systems-prepaid-water-meter/ ; 4 pages.

International Preliminary Report on Patentability and Written Opinion; PCT/EP2016/069284; Feb. 27, 2018; 11 pages.

Laisongroup.com [online]; Product Center, 2019 (retrieved Mar. 2, 2020). Retrieved from the Internet: http://www.laisongroup.com/productcenter/info.aspx?itemid=321&lcid=72 ; 3 pages.

Manas.com [online]; 2014 (retrieved Mar. 2, 2020). Retrieved from the Internet: http://en.manas.com.tr/smart-water-meters/ ; 1 page.

Prepaidmeters.com [online]; Resources; 2003 (retrieved Mar. 2, 2020). Retrieved from the Internet: http://www.prepaidmeters.co.za/devices/water-meters ; 3 pages.

Ruvick.com [online]; Services; 2019 (retrieved Mar. 2, 2020). Retrieved from the Internet: http://www.ruvick.com/RuvickWater.html ; 3 pages.

Smarterhomes.com [online]. Information; 2018 (retrieved Mar. 2, 2020). Retrieved from the Internet: https://smarterhomes.com/wateron.html#features ; 10 pages.

Teksan.com; Pre-Paid Water Meter 2014 (retrieved Mar. 2, 2020). Retrieved from the Internet: http://teksan.com.tr/en/prepaidwatermeter.html#all ; 5 pages.

Waterwatch.co.za [online]; Waterwatch Features; 2017 (retrieved Mar. 2, 2020). Retrieved from the Internet: https://waterwatch.co.za/ ; 9 pages.

* cited by examiner

RESOURCE DELIVERY

TECHNICAL FIELD

This disclosure generally relates to delivering resources.

BACKGROUND

Resources may be delivered by resource providers. For example, water utilities may provide water to homes through water pipes. Users may then be charged for resources delivered by the resource providers. For example, water utilities may charge home owners on a monthly basis for water delivered to the home. In other cases, resource providers may provide resources to a point of delivery after users insert tokens associated with prepayment for resources into a meter at the point of delivery.

SUMMARY

In general, an aspect of the subject matter described in this specification may involve a system for delivering resources. In much of the developing world, the urban poor face the daily challenge of procuring water. Many cannot pay monthly bills and high upfront connection costs due to their irregular incomes. They turn to substitutes such as public water points, delivery services and chlorine pills, which can be up to 15 times more expensive than utility piped water, and are often low quality and unreliable. Women and girls are most affected, spending over 200 million hours fetching water annually, with 443 million school days being lost due to illness. Global urbanization trends will only exacerbate the strain on water utility infrastructure, with African cities alone growing by 5% every year.

A system for delivering resources may help provide resources. For example, the system may help bring piped water to homes. The system may help provide resources by reducing costs of billing and delinquencies for resource providers. For example, the system may reduce costs of billing and delinquencies for water utilities. The system may reduce costs and delinquencies by enabling micro-prepayments for resources. For example, the system may enable a user to use a mobile phone to prepay $1 for a thousand gallons of water to be received through a water pipe at the user's home and stop providing piped water once a prepaid amount of water has been delivered.

The system may enable micro-prepayments for resources through a distributed architecture including a central server (or servers), one or more intermediate gateways in communication with the central server over wireless connections that incur cellular network charges, and supply outlets each located in a home or other resource supply location and each in communication with an intermediate gateway over a connection (e.g., a wireless connection) that does not incur a cellular network charge. These supply outlets may regulate an amount of resources that are provided to the home. For example, a water meter may only allow up to a pre-paid amount of water to flow from a water pipe, all while allowing the user to determine when, how frequently, and over which time period no more than the total prepaid amount of water is drawn from the supply outlet. The supply outlets may be battery powered or self-powered, e.g., solar powered or hydro powered, and receive prepayment order information from the intermediate gateways. For example, the supply outlets may be powered by AA batteries or other kinds of batteries and receive prepayment order information (for example, the amount of water that can be dispensed for the amount of a prepayment) from the intermediate gateways through transceivers operating in industrial, scientific and medical (ISM) radio frequency bands.

The intermediate gateways may each provide prepayment order information to a corresponding set of supply outlets associated with the intermediate gateway and may in turn receive prepayment order information from a central server with respect to the supply outlets served by that intermediate gateway. For example, an intermediate gateway may provide prepayment order information for a set of one hundred supply outlets in a first neighborhood through transceivers operating on ISM radio frequency bands, another intermediate gateway may provide prepayment order information for a set of two hundred supply outlets in a second neighborhood through transceivers operating on ISM radio frequency bands, and both of the intermediate gateways may receive prepayment order information from a central server through 3G transceivers.

The central server may generate prepayment order information in response to receiving prepayments for corresponding accounts through one or more electronic payment services. For example, the central server may receive a prepayment of $1 from the electronic payment service for a user, and in response, generate prepayment order information of a thousand gallons of water to be credited to the user. Accordingly, the system may provide a low cost approach for resources to be delivered.

In some aspects, the subject matter described in this specification may be embodied in methods that may include the actions of, based on measurements of amounts of a resource that are delivered from one or more supply outlets against amounts of value of electronic prepayments that have been authorized by corresponding users of mobile devices for the delivery of the resource at the one or more supply outlets, causing the one or more supply outlets to enable delivery of the resource in aggregate amounts that are not outside amounts of value of electronic prepayments that have been authorized by the corresponding users of mobile devices for the delivery of the resource.

In some aspects, the subject matter described in this specification may be embodied in methods that may include the actions of receiving from an electronic payment service a payment of monetary value that has been authorized at a mobile device, the monetary value to be used to pay for an amount of a resource to be dispensed at a supply outlet, and, based on the monetary value, electronically sending one or more commands to cause a supply outlet to enable the dispensing of the amount of the resource at the supply outlet.

In some aspects, the subject matter described in this specification may be embodied in methods that may include the actions of distributing from a central server through a cellular network to gateways, commands to control water supply outlets to enable the dispensing of water at distributed geographic locations, the commands being distributed from each of the gateways to a corresponding subset of the water supply outlets using a communication network different than the cellular network.

In some aspects, the subject matter described in this specification may be embodied in methods that may include the actions of receiving at a central server through a cellular network from intermediary gateways, water flow volume information metered at individual water supply outlets at which water is dispensed to end users at distributed geographic locations, the water flow information having been collected at each of the intermediary gateways from a corresponding subset of the water supply outlets using a communication network the use of which does not incur a cellular network charge.

In some aspects, the subject matter described in this specification may be embodied in methods that may include the actions of receiving from an electronic payment service a payment of monetary value authorized from a mobile device for an amount of a resource to be dispensed to a user, based on the receipt of the payment, electronically sending one or more commands to cause a specific supply outlet to dispense the paid-for amount of the resource for the benefit of the user.

In some aspects, the subject matter described in this specification may be embodied in an apparatus that includes a gateway for information about delivery of amounts of resources at supply outlets to consumers consistent with values held in accounts. The gateway includes a transceiver to communicate with the supply outlets, one or more transceivers to communicate on a communication network with the central server, and storage for (a) information that is received from the central server and is to be sent to the supply outlets to deliver controlled amounts of the resources based on prepayments of value into the accounts, and (b) resource delivery information that is received from the supply outlets and is to be sent to the central server.

In some aspects, the subject matter described in this specification may be embodied in an apparatus that includes a gateway for information about water delivered at a set of water supply outlets at which water is dispensed to end users at distributed geographic locations. The gateway includes a transceiver to communicate wirelessly with the individual water supply outlets, one or more transceivers to communicate wirelessly with a central server, and storage for (a) commands received from the central server and to be sent to the individual water supply outlets to dispense controlled amounts of water based on prepayments by end users, (b) water flow volume information received from the individual water supply outlets and to be sent to the central server.

In some aspects, the subject matter described in this specification may be embodied in an apparatus that includes a water supply outlet for dispensing water at a location. The water supply outlet includes a valve that is controllable by a signal to dispense no more than a specific volume of water at the location, a device to measure water flow volume, and a transceiver to communicate wirelessly through a network that does not incur a cellular network charge to receive one or more commands generated by a central server to be used to cause the controlled volume of water to be dispensed and to send water flow volume signals from the measuring device for use at the central server.

Other versions include corresponding systems, apparatus, and computer programs, configured to perform the actions of the methods, encoded on computer storage devices.

These and other versions may each optionally include one or more of the following features. For instance, in some implementations, the resource includes one or more of water, a flowing resource, or domestic water. In some aspects, the supply outlets include valve controls for water lines. In certain aspects, the supply outlets include water meters for water lines. In some implementations, actions include receiving prepayments from an electronic payment system, where the prepayments each indicate an amount of value of electronic prepayment that has been authorized by a corresponding user of a mobile device for the delivery of the resource at the one or more supply outlets.

In certain aspects, causing the one or more supply outlets to enable delivery of the resource in aggregate amounts that are not outside amounts of value of electronic prepayments that have been authorized by the corresponding users of mobile devices for the delivery of the resource includes determining the amounts of resource for which to enable delivery based on the amount of value of electronic prepayment. In some aspects, causing the one or more supply outlets to enable delivery of the resource in aggregate amounts that are not outside amounts of value of electronic prepayments that have been authorized by the corresponding users of mobile devices for the delivery of the resource includes providing the amount of resource to enable delivery.

In some implementations, mobile devices include one or more of non-smart phones, smart phones, tablet computers, or smart watches. In certain aspects, the gateway provides the resource delivery information to the central server when the gateway requests, from the central server, information to be sent to the supply outlets. In some aspects, the values held in accounts reflect an amount of a resource to provide. In some implementations, the payment of the monetary value is authorized by the user. In certain aspects, actions include determining the amount of the resource to be dispensed based on the monetary value.

In some aspects, the commands control on and off operation of valves at the water supply outlets. In some implementations, the central server provides information indicating the water flow volume information to mobile devices of the end users. In certain aspects, the commands include an order to increment an amount of water available to be dispensed from a particular water supply outlet by a particular amount. In some aspects, the storage is for (c) commands received from the central server and to be sent to the individual water supply outlets to prevent water supply outlets from dispensing water until another command is sent to the individual water supply outlet to enable the water supply outlets to dispense water.

In some implementations, the water supply outlet includes a microcontroller configured to manage energy consumption of the water supply outlet based on turning off or depowering components of the water supply outlet. In certain aspects, the microcontroller is configured to manage energy consumption of the water supply outlet based on determining that water has not flowed through the device to measure water flow volume for a predetermined length of time, and in response to determining that water has not flowed through the device to measure water flow volume for the predetermined length of time, causing the water supply outlet to enter a deep sleep period in which one or more components of the water supply outlet are turned off or depowered. In some aspects, the water supply outlet includes a microcontroller that determines the volume of water dispensed from the water supply outlet using non-floating point calculations.

The details of one or more implementations of the subject matter described in this specification are set forth in the accompanying drawings and the description below. Other potential features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Figure 1:
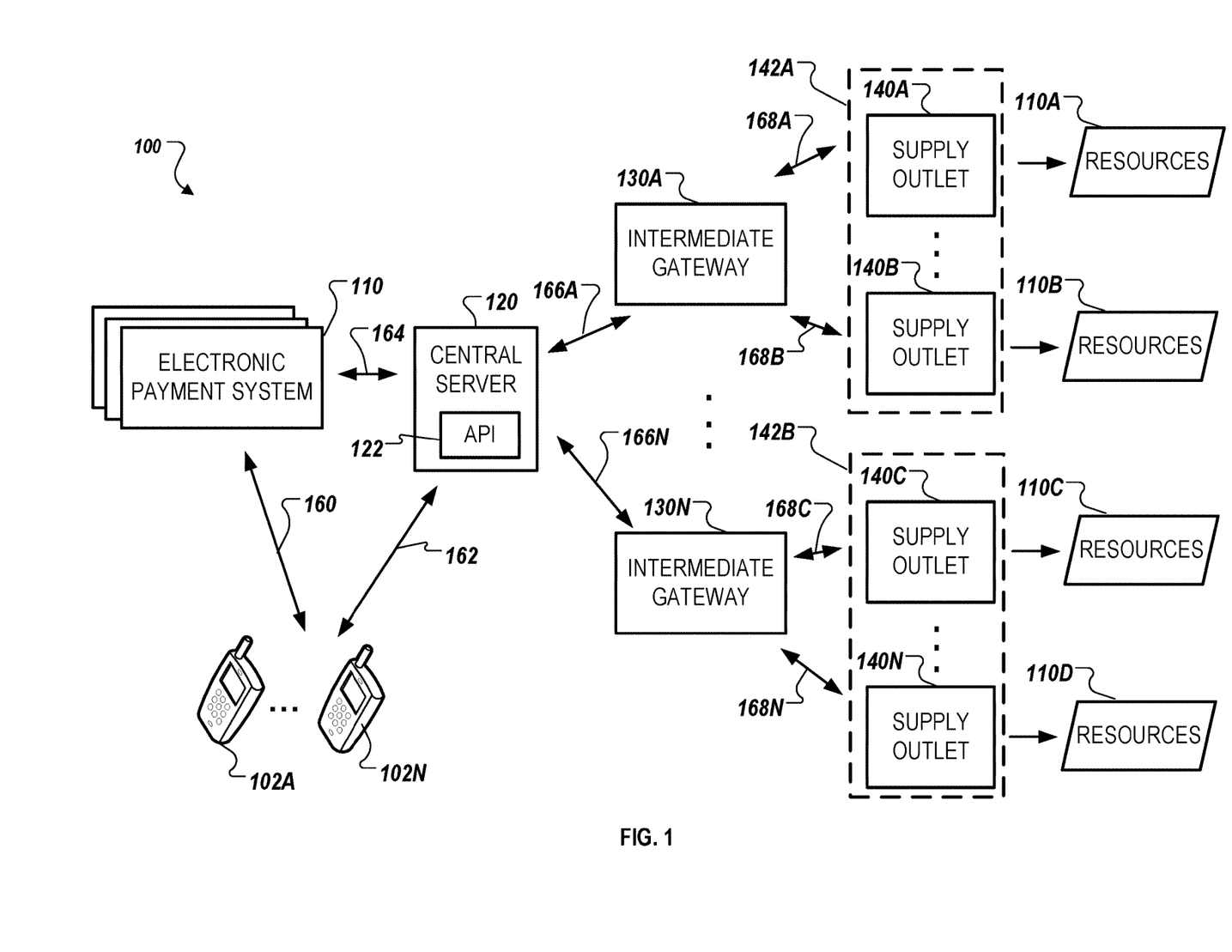
FIG. 1 is a block diagram of an example system for delivering resources.

FIG. 1 is a block diagram of an example system 100 for providing resources 101A-N (collectively referred to as 101). Briefly, and as described in further detail below, the system 100 may include mobile devices 102A-N (collectively referred to as 102), one or more electronic payment system 110, a central server 120, intermediate gateways 130A-N (collectively referred to as 130), and supply outlets 140A-N (collectively referred to as 140).

The mobile devices 102 may be in communication with the one or more electronic payment systems 110 and the central server 120 through wireless connections 160 and 162, respectively, which incur cellular network charges, e.g., a 2G, 3G, or 4G network, or wireless connections that does not incur a cellular network charge, e.g., Wi-Fi, or a combination of the two. The one or more electronic payment system 110 may be in communication with the central server 120 through an Internet connection 164, e.g., a wired or wireless connection. The central server 120 may be in communication with remote intermediate gateways 130 through wireless connections 166A-166N that incur a cellular network charges, e.g., a 2G, 3G, or 4G networks. Each of the intermediate gateways 130 may be in communication with a set 142A, 142B of remote supply outlets 140 through a wireless connection 168A-168N, for example, a wireless connection that does not incur a cellular network charge, e.g., ISM band based network.

As a range of wireless connections that do not incur a cellular network charge may be limited, the supply outlets 140 in each set of supply outlets 140 associated with each intermediate gateway 130 may be those supply outlets 140 that are in a particular geographical area in which communications between the supply outlet and the intermediate gateway may be established. For example, the set 142A of the supply outlets including the supply outlet 140A and the supply outlet 1406 may be the supply outlets within a particular area in which communications between the supply outlets 140A and 1406 and the intermediate gateway 130A may be established. In another example, the set 1426 of the supply outlets including the supply outlet 140C and the supply outlet 140N may be the supply outlets within a particular area in which communications between the supply outlets 140C and 140N and the intermediate gateway 130B may be established. Each intermediate gateway 130 may be associated with a set of supply outlets that are within a one hundred feet, one thousand feet, one mile, or some other distance radius of the intermediate gateway 130, or a set of supply outlets that are within some other defined geographic area.

The mobile devices 102 may enable users to provide prepayment instructions. The mobile devices 102 may be non-smart phones, smart phones, tablet computers, smart watches, or other devices. The mobile devices 102 may enable users to provide prepayment instructions through a text interface, graphical user interface or voice interface or a combination of two or more of them. For example, the mobile devices 102 may enable users to provide prepayment instructions through a text menu using Short Messaging Service (SMS) or Unstructured Supplementary Service Data (USSD) messages. In another example, the graphical user interface may include fields in which users may provide payment instructions for resources to be delivered or a voice interface may include prompts in response to which users may provide payment instructions for resources to be delivered.

Each of the supply outlets 140 may be associated with a unique account that is associated with a unique identifier. For example, the supply outlet 140A may be associated with one account and the supply outlet 140B may be associated with another account. Accordingly, in receiving information from a user for prepayment instruction, a mobile device may receive an indication of a particular supply outlet or a particular account that the payment will be credited towards. For example, the user may enter a unique identifier for the unique account associated with the supply outlet 140B to indicate that supply outlet 140B is to be credited a particular prepayment. Using the mobile devices 102, a single user may provide prepayment instructions for multiple supply outlets. For example, a single user may provide prepayments instructions for the supply outlet 140A and the supply outlet 140C by entering a unique identifier for an account associated with the account supply outlet 140A for a first prepayment instruction and later entering a unique identifier for an account associated with the supply outlet 140C for a second prepayment instruction.

The mobile devices 102 may provide the prepayment instructions to the one or more electronic payment systems 110. For example, the mobile devices 102 may use a 3G cellular connection to provide the prepayment instructions for an amount of $1 for supply outlet 140B to the one or more electronic payment systems 110 through the Internet.

In some implementations, the mobile devices 102 receive confirmations. For example, a mobile device 102 may receive a confirmation that a supply outlet 140B has been credited for the prepayment. The confirmation indicates an amount of resource credited for the prepayment and a total remaining amount of resource prepaid for the supply outlet 140B, and display the confirmation to users. The total remaining amount of resource prepaid for the supply outlet 140B may be different than the amount of resource credited for a particular prepayment because the amount of resource credited for a particular prepayment may be added to a remaining amount of resource already prepaid for the supply outlet 140B from a previous prepayment. In some implementations, the mobile devices 102 enable users to view prepayment and usage information for supply outlets. For example, a user may use a mobile device to request a history of prepayments for a particular supply outlet, a history of amounts and dates that resources were provided through the particular supply outlet, an amount of a resource remaining prepaid for the supply outlet, or some other information.

The one or more electronic payment systems 110 may process prepayment instructions. For example, the one or more electronic payment systems 110 may receive a prepayment instruction of $1 from a particular mobile device of a particular user, determine a payment source for the prepayment instruction, e.g., determine a credit card account, bank account, virtual wallet, mobile money account, or some other payment source, charge $1 to the payment source, and determine that the charge is successfully completed. Example electronic payment systems 110 may include PayPal, Venmo, or other non-physical-cash based payment systems. In some implementations, the electronic payments systems 110 and the central server 120 may be controlled by the same entity or by different entities, e.g., companies.

After processing a prepayment instruction, the one or more electronic payment systems 110 may provide prepayment information to the central server 120. For example, the one or more electronic payment systems 110 may provide prepayment information that indicates a prepayment of $1 for supply outlet 140B to the central server 120 over the Internet, e.g., through an application program interface (API) call in the form of a HTTPS request including parameters indicating the prepayment information.

The central server 120 may process prepayment information to credit accounts associated with the supply outlets 140. The central server 120 may be one or more computers. For example, the central server 120 may be a cloud computing platform including multiple servers or a single server. The central server 120 may receive the prepayment information from the one or more electronic payment systems 110, receive requests from the intermediate gateways 130 for prepayment orders, and in response to the requests, provide prepayment orders to the intermediate gateways 130 for the intermediate gateways 130 to provide to the appropriate supply outlets 140. An example interaction is further described below in FIGS. 2A and 2B. The central server 120 may also receive, from the intermediate gateways 130, information describing resources delivered by the supply outlets 140, and provide reports to the mobile devices 102 indicating a history of orders and usage. The central server 120 may include an API through which prepayment information may be received from the one or more electronic payment systems 110. In some implementations, the central server 120 may provide assist users of mobile devices 102 to make prepayments. For example, the central server 120 may suggest an amount of resource to prepay for a supply outlet based on determining a typical weekly usage amount for the supply outlet, and a corresponding monetary value for the amount of the resource.

The intermediate gateways 130 may be one or more computers that receive prepayment orders from the central server 120 and provide the prepayment orders to the supply outlets 140. For example, the intermediate gateway 130A may receive a prepayment order for the supply outlet 140B and, in response to a request from the supply outlet 140B for prepayment orders for the supply outlet 140B, provide the prepayment order to the supply outlet 140B. An example interaction is further described below in the description related to FIG. 2B. The intermediate gateways 130 may also receive, from the supply outlets 140, information describing amounts of resources delivered by the supply outlets 140 and provide the information to the central server 120.

The supply outlets 140 may be one or more devices that regulate an amount of the resources 101 that are provided. The supply outlets 140 may regulate the amount of the resources 101 that are provided by, for each supply outlet, limiting an amount of the resource 101 that may be provided from the supply outlet to the amount of the resource 101 for which prepayment has been received. For example, the supply outlet 140B may monitor an amount of resource provided by the supply outlet 140B and an amount of resources prepaid for the supply outlet 140B, and when the amount of resources provided by the supply outlet 140B reaches the amount of resources prepaid for the supply outlet 140B, prevent additional amounts of the resource from being provided by the supply outlet 140B. An example of a supply outlet in the form of water meter that controls whether water may be delivered through a faucet is further described below in FIG. 3.

Different configurations of the system 100 may be used where functionality of any combination of two or more of the mobile devices 102, the one or more electronic payment systems 110, the central server 120, the intermediate gateways 130, and the supply outlets 140 may be combined, further separated, distributed, or interchanged. For example, the one or more electronic payment system 110 and the central server 120 may be combined in a single system.

Figure 2A:
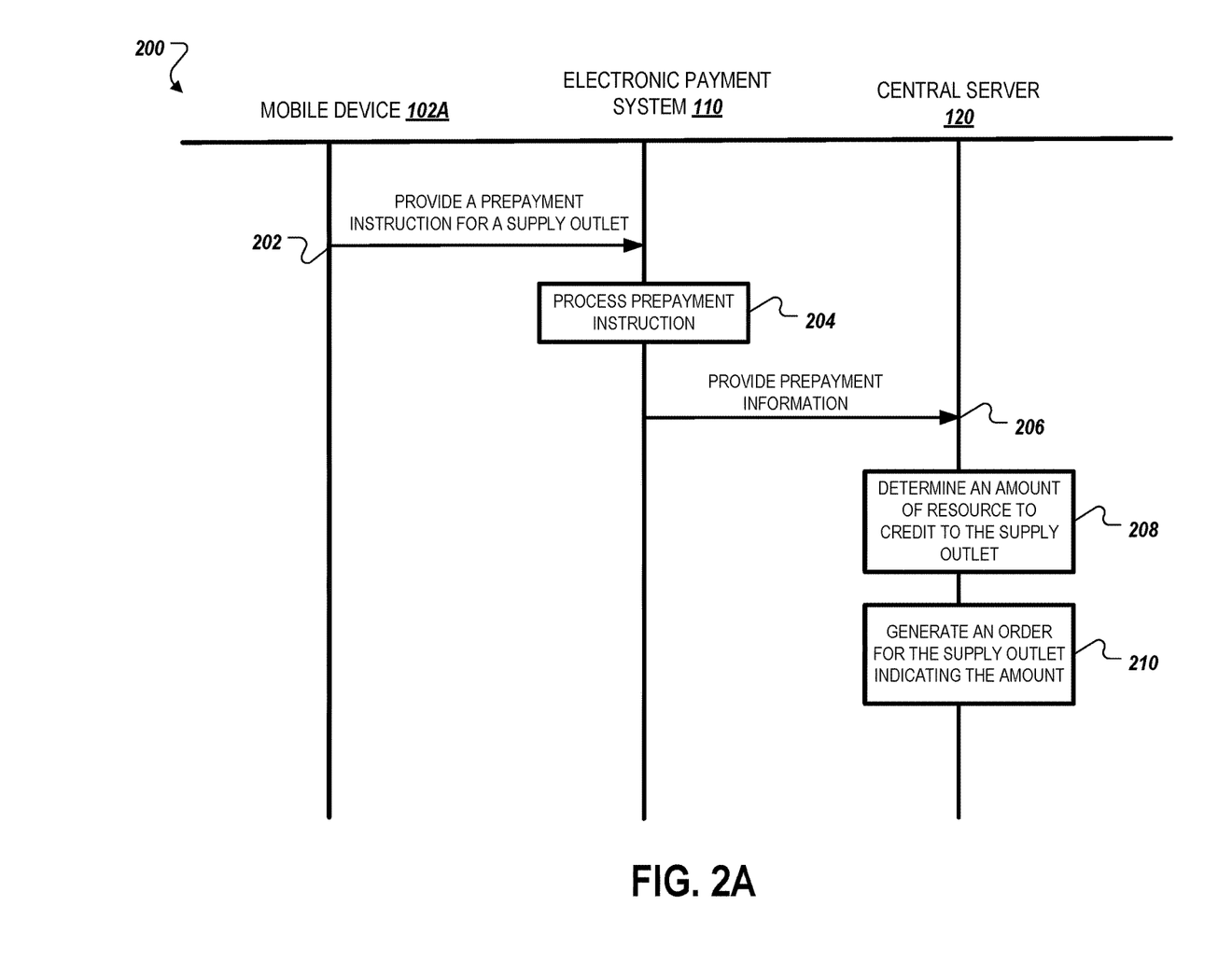
FIGS. 2A and 2B are interaction diagrams of example interactions for delivering resources.
Figure 2B:
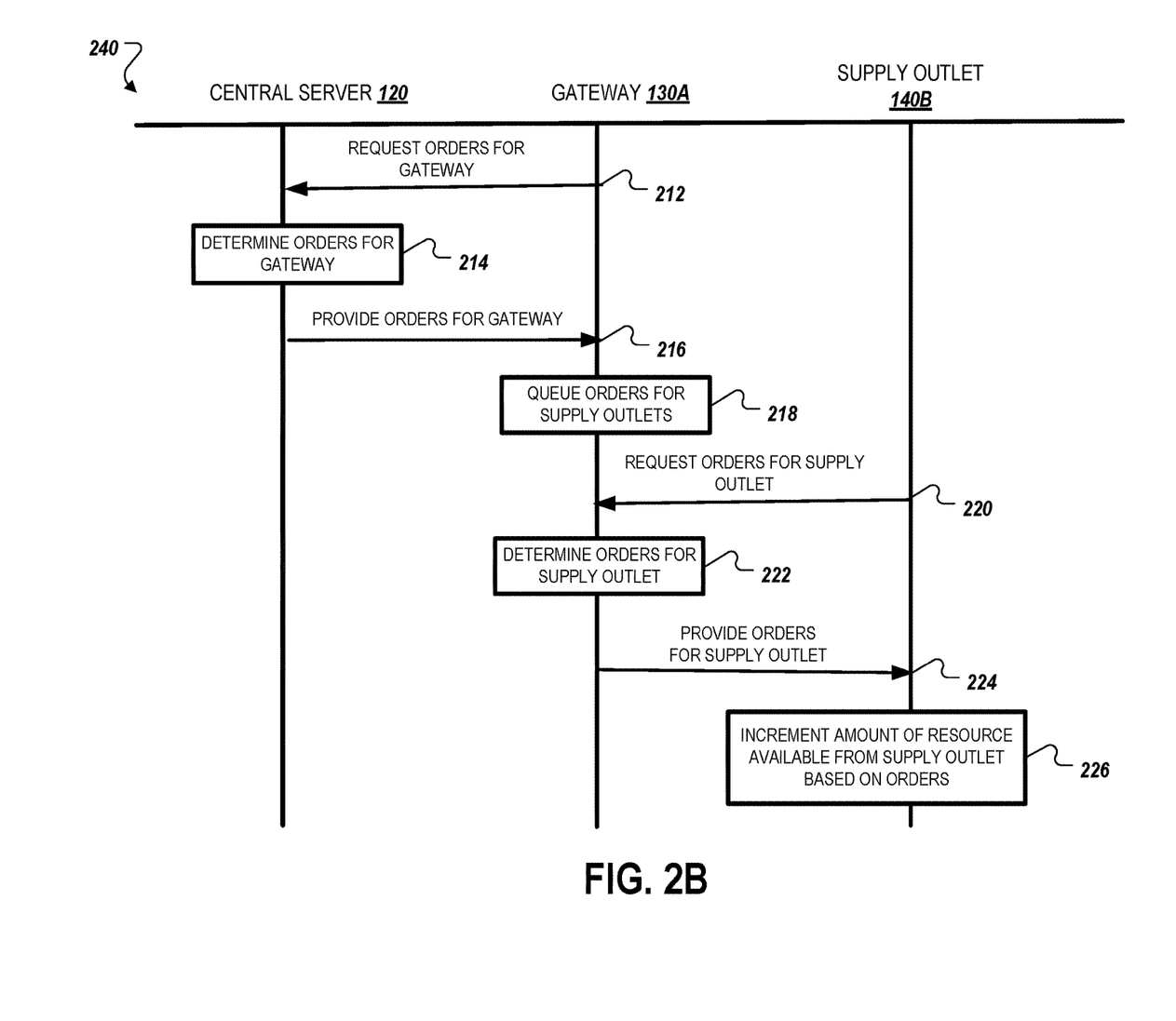

FIGS. 2A and 2B are interaction diagrams 200, 240 of example interactions for delivering resources. The following describes the interaction as being performed by components of the system 100 that are described with reference to FIG. 1. However, the interaction may be performed by other systems or system configurations or other combinations of the components. Additionally, while interactions are described as being performed by the mobile device 102A, the gateway 130A, and the supply outlet 140B, similar interactions may be performed by other mobile devices of the mobile devices 102, other gateways of the gateways 130, or other supply outlets of the supply outlets 140.

Initially, the mobile device 102A may provide a prepayment instruction for a supply outlet to the electronic payment system 110 (202). For example, the mobile device 102A may provide a prepayment instruction for a payment of $1 in response to input from a user indicating an amount of $1 be credited to a unique identifier associated with an account associated with the supply outlet 140B. In another example, the mobile device 102A may provide prepayment instruction for payment of $1 without specifying an account for the central server 120 to credit, and as described below, the central server 120 may determine an account of a supply outlet to credit by default for the mobile device 102A.

The electronic payment system 110 may receive the prepayment instruction and, in response, process the prepayment instruction (204). For example, the electronic payment system 110 may receive the prepayment instruction of $1 from the mobile device 102A and charge $1 to a payment source associated with the mobile device 102A or with the user or otherwise indicated by the prepayment instruction.

The electronic payment system 110 may provide prepayment information to the central server 120 (206). For example, in response to successfully charging $1 in response to a prepayment instruction indicating $1, the electronic payment system 110 may access an API of the central server and include parameters indicating a phone number, e.g., (999) 999-9999 of the mobile device 102 that provided the prepayment, the amount paid, e.g., $1, a timestamp for the prepayment, e.g., 1/1/2015 11:11:11 AM, and an indication of the supply outlet to credit, e.g., the unique identifier for the account associated with the supply outlet 140B.

The central server 120 may receive the prepayment information and, in response, determine an amount of the resource to credit to a supply outlet (208). For example, the central server 120 may credit one thousand gallons of water to the supply outlet 140B. The central server 120 may determine the amount of resource to credit to the supply outlet based on translating the monetary value of the prepayment amount to a corresponding amount of resource. For example, the central server 120 may determine to credit the supply outlet 140B based on determining that a thousand gallons of water is $1, and in response, determine to credit the supply outlet 140B one thousand gallons of water for the prepayment of $1. In another example, the central server 120 may determine to credit the supply outlet 140B based on determining that a thousand gallons of water is $2, and in response, determine to credit the supply outlet 140B 500 gallons of water for the prepayment of $1. The central server 120 may additionally or alternatively determine the amount of resource to credit to the supply outlet based on a pricing function that calculates an amount of resource for a monetary amount.

The central server 120 may generate an order for the supply outlet that indicates the amount of resource to credit to the supply outlet (210). For example, after determining to credit one thousand gallons of water to the supply outlet 140B, the central server may generate an order indicating that the supply outlet 140B be credited one thousand gallons and queue the order in an order queue.

In generating the orders, the central server 120 may use information that stores, one or more of, associations between (i) users and user accounts associated with the users, (ii) unique identifiers for accounts for supply outlets and unique identifiers for supply outlets associated with the accounts for the supply outlets, (iii) sets of supply outlets 140 and corresponding gateways associated with each set, and (iv) gateways 130 and the central server 120 associated with the gateways 130. The associations may be permanent or may be modified. For example, a particular supply outlet may be associated with one gateway but if another gateway is established closer to the particular supply outlet with a more reliable connection, the other gateway may be associated with the central server 120 and the particular supply outlet may be re-associated with the other gateway that is established closer. In another example, if a supply outlet moves closer to another gateway, the supply outlet may be re-associated with the other gateway.

Each of the orders generated by the central server 120 may indicate unique identifiers for the supply outlet to receive the order. For example, an order for the supply outlet 140B may include a unique identifier for the supply outlet 140B. The unique identifier for the supply outlet may be used to route the order to the supply outlet, as described in FIG. 2B. In some implementations, the unique identifier associated with the supply outlet may be the unique identifier associated with the unique account associated with the supply outlet. For example, where the prepayment instruction and prepayment information indicate an account associated with a supply outlet to credit, the central server 120 may determine a unique identifier for the supply outlet associated with the account, and in response, determine to provide a prepayment order to the supply outlet with the unique identifier determined to be associated with the account.

The central server 120 may store user accounts that may each be an account that is associated with a user where the account specifies one or more of a default account of a supply outlet to credit, accounts of supply outlets for which the user is authorized to view information, payment sources associated with the user, and one or more phone numbers associated with the user. For example, a user account for a particular user may specify for the default account to credit the unique identifier for the account associated with the supply outlet 140B, a PayPal account name associated with the user, and a phone number of (999) 999-9999 associated with the user. Where the prepayment instruction and prepayment information received by the central server 120 do not indicate a supply outlet or an account to credit, the central server 120 may determine a particular user account associated with the phone number (999) 999-9999 indicated by the prepayment information, a default account associated with the supply outlet 140B for the particular user account, and credit the account for the supply outlet 140B because it is the default account.

The associations may include mappings that indicate which supply outlets 140 are associated with which gateway 130. For example, a mapping may indicate that the supply outlet 140A and the supply outlet 140B are both associated with the gateway 130A. The central server 120 may include in the order an identifier for a gateway to receive the order to forward to a supply outlet based on the mappings. The unique identifier for the gateway may be used to route the order to the supply outlet, as described in FIG. 2B. The central server 120 may determine the identifier for the gateway to include in the order based on the associations. For example, the central server 120 may determine orders for the gateway 130A based on receiving prepayment information for the supply outlet 140A, determining that the supply outlet 140A is mapped to the gateway 130A, and in response, generating the order to indicate the gateway 130A should receive the order.

The central server 120 may additionally or alternatively include in each of the orders a unique identifier for the order that distinguishes the order from other orders. The unique identifier for the order may be used to ensure that an order is received by a supply outlet and is not credited more than once, as described in FIG. 2B.

In some implementations, after generating the order, the central server 120 may provide a confirmation to a user who made the prepayment. For example, the central server 120 may transmit a SMS text message to the phone number that provided the prepayment indicating that the account or supply outlet will be credited shortly.

FIG. 2B illustrates how, in some implementations, the central server 120 may not proactively provide the gateways 130 orders and the gateways may not proactively provide the supply outlets 140 orders received from the central server 120. Instead, the central server 120 may provide generated orders to the gateways 130 in response to requests for orders from the gateways 130, and the gateways 130 may provide the supply outlets 140 orders in response to requests from the supply outlets 140 for orders. In some implementations, combinations of the approach described earlier in this approach for generating and requesting orders may be used.

In more detail, the gateway 130A may request orders for supply outlets associated with the gateway 130A from the central server 120 (212). For example, the gateway 130A may request orders for the gateway 130A over a 2G/3G wireless Internet connection that incurs a cellular network charge, where the request is for all orders for the gateway 130A not already received by the gateway 130A. The gateways 130A may request orders at regular intervals. For example, the supply outlets may provide requests every thirty seconds, minute, five minute, or some other interval. The gateways 130 may request orders from the central server 120 as 3G internet connections may be rarely remotely accessible. The request for orders may include a unique identifier for the gateway indicating that the request is from the gateway.

The central server 120 may obtain the request for orders for the gateway 130A, and in response, determine orders for the gateway 130A (214). For example, the central server 120 may determine an order of one thousand gallons of water for supply outlet 140B and an order of one thousand gallons of water for supply outlet 140A are for the gateway. The central server 120 may determine orders for a gateway based on mappings indicating which supply outlets 140 are associated with which gateway 130. For example, the central server 120 may determine orders for the gateway 130A based on, in response to a request indicating the request is from gateway 130A, determining that both the supply outlet 140A and the supply outlet 140B are mapped to the gateway 130A and in response, determining that orders for the supply outlet 140A and the supply outlet 140B are for the gateway 130A. In another example, the central server 120 may determine orders for the gateway 130A based on orders that already indicate which gateway is associated with the order, and identifying the orders that indicate that the order is for gateway 130A.

The central server 120 may provide the orders for the gateway 130A to the gateway 130A (216). For example, the central server 120 may provide the gateway 130A an order of one thousand gallons of water for the supply outlet 140B, an order of two thousand gallons of water for the supply outlet 140B, and an order of one thousand gallon of water for the supply outlet 140A. In providing the orders for a gateway, the central server 120 may continue providing an order for a gateway until the central server 120 receives a confirmation from the gateway indicating that the gateway has received the order. For example, if the central server 120 does not receive a confirmation that the gateway 130A received the order of one thousand gallons of water for supply outlet 140B, the order of two thousand gallons of water for the supply outlet 140B, or the order of one thousand gallons of water for supply outlet 140A, the central server 120 may provide the orders to the gateway 130A again the next time the gateway 130A requests orders for the gateway. By providing orders until a confirmation is received, the central server 120 may ensure orders are received by the gateway 130A even when a connection with the gateway 130A is unreliable.

The confirmations from the gateway 130A may indicate unique identifiers for the orders that were received by the gateway 130A. Accordingly, the central server 120 may determine which orders were not received by the gateway 130A based on a lack of confirmation including the unique identifier for those orders, and provide again those orders for which no confirmation was received. By avoiding sending orders for which confirmation has already been received, the system 100 may avoid redundant processing or accidentally crediting an order multiple times.

The gateway 130A may receive the orders and queue the orders for providing to the supply outlets 140 (218). For example, the gateway 130A may receive an order of one thousand gallons of water for the supply outlet 140B, an order of two thousand gallons of water for the supply outlet 140B, and an order of one thousand gallons of water for the supply outlet 140A, and queue to provide the order of one thousand gallons of water and the order of two thousand gallons of water for the supply outlet 140B to the supply outlet 140B once the supply outlet 140B requests orders for the supply outlet 140B, and queue to provide the order of one thousand gallons of water for the supply outlet 140A to supply outlet 140A once the supply outlet 140A requests orders for the supply outlet 140A.

As discussed above, the gateway 130A may also provide confirmations to the central server 120 that orders from the central server 120 were received by the gateway 130A. The gateway 130A may also ensure that a particular order is not queued to be provided to the supply outlets 140 multiple times. For example, in the case where the gateway 130A provided a confirmation that a particular order was received to the central server 120 but the central server 120 did not receive the confirmation due to an unreliable connection, the gateway 130A may receive a duplicate order from the central server 120 with a particular unique identifier, determine that an order with the same unique identifier is or was already queued to be provided to a supply outlet, and in response, determine to discard the duplicate order and send another confirmation to the central server 120 that the order was received by the gateway 130A.

The supply outlet 140B may request orders for the supply outlet 140B (220). For example, the supply outlet 140B may provide a request to the gateway 130A over a wireless connection that does not incur a cellular network charge, where the request is for all orders for the supply outlet 140B that have not yet been received by the supply outlet 140B. A request from a supply outlet may include a unique identifier of the supply outlet that indicates that the request is from the supply outlet.

The supply outlets may provide requests at regular intervals. For example, the supply outlets may provide requests every thirty seconds, minute, five minute, or some other interval. By receiving orders in response to requests, the supply outlets may conserve power as the supply outlets may only need to listen for orders from the gateways for predetermined time lengths, e.g., one second, five seconds, fifteen seconds, or some other time length, after providing the request.

In response to receiving a request for orders for a supply outlet, the gateway 130A may determine orders for the supply outlet (222). For example, the gateway 130A may receive a request from the supply outlet 140B for orders for the supply outlet 140B, and in response, determine an order of one thousand gallons of water and an order of two thousand gallons of water is for the supply outlet 140B. In another example, the gateway 130A may receive a request from the supply outlet 140A for orders for the supply outlet 140A, and in response, determine an order of one thousand gallons of water is for the supply outlet 140A. The gateway 130A may determine orders for a supply outlet based on determining a unique identifier of a supply outlet in the request, and determine orders that indicate that the order is for the unique identifier of the supply outlet that provided the request.

The gateway 130A may provide the orders for the supply outlet 140B to the supply outlet 140B (224). For example, the gateway 130A may determine an order of one thousand gallons of water and an order of two thousand gallons of water is for the supply outlet 140B, and in response, provide the order of one thousand gallons of water and the order of two thousand gallons of water to the supply outlet 140B.

In providing the orders for supply outlets 140, the gateway 130A may continue providing an order until the gateway 130A receives a confirmation from the supply outlets 140 indicating that the relevant supply outlet has received the order. For example, if the gateway 130A does not receive a confirmation that the supply outlet 140B received the orders provided to the supply outlet 140B, the gateway 130A may again provide the orders to the supply outlet 140B the next time the supply outlet 140B requests orders for the supply outlet 140B. Similarly to as discussed for the central server 120, the gateway 130A may determine to provide an order with a unique identifier again based on determining that a confirmation, that indicates that an order with the unique identifier was received by the supply outlet, was not received from the supply outlet.

The supply outlet 140B may receive the orders and increment an amount of resource available from the supply outlet 140B based on the orders received by the supply outlet 140B (226). For example, the supply outlet 140B may already store that four thousand gallons of water are prepaid for the supply outlet 140B, receive orders of one thousand gallons and two thousand gallons prepaid for the supply outlet 140B, and increment the amount of water prepaid for the supply outlet 140B from four thousand gallons to seven thousand gallons.

The supply outlet 140B may also ensure that a particular order is not credited multiple times. For example, in the case where the supply outlet 140B provided a confirmation that a particular order was received to the gateway 130A but the gateway 130A did not receive the confirmation due to an unreliable connection, the supply outlet 140B may receive a duplicate order from the gateway 130A with a particular unique identifier, determine that an order with the same unique identifier already caused the supply outlet 140B to increment an amount of resource available, and in response, determine to discard the duplicate order and send another confirmation to the gateway 130A that the order was received by the supply outlet 140B.

In some implementations, the supply outlet 140B may also provide resource usage information to the gateway 130A to provide to the central server 120. For example, the supply outlet 140B may provide, to the gateway 130A, information indicating one hundred gallons of water have been provided by the supply outlet 140B, and the gateway 130A may then provide, to the central server 120, information indicating that the supply outlet 140B has provided one hundred gallons of water.

The supply outlet 140B may provide the information indicating resource usage information when the supply outlet 140B requests orders for the supply outlet 140B. For example, each time the supply outlet 140B requests orders for the supply outlet 140B, the supply outlet 140B may also include information indicating a total amount of water provided by the supply outlet 140B. The gateway 130A may receive the information indicating a total amount of water provided by the supply outlet 140B and receive information from other supply outlets, add a timestamp to the information indicating when the information was received from the supply outlet 140B, and queue to provide the information the next time the gateway 130A requests orders for the gateway 130A. The central server 120 may receive the information indicating total amounts of water provided by supply outlets and based on increases in total amounts for a supply outlet, determine an amount of water provided by the supply outlet. For example, the central server 120 may receive information indicating that a total of one hundred gallons of water were provided by the supply outlet 140B at 2 PM and determine that the central server 120 previously received information indicating that a total of ninety five gallons of water were provided by the supply outlet 140B at 1:45 PM, and in response, determine that five gallons of water were provided by the supply outlet 140B between 1:45 PM and 2 PM. The central server 120 may store the usage history to provide usage history to users and order history to users.

In some implementations, the central server 120 may alternatively or additionally provide commands to the supply outlets 140 through a similar process as providing orders. The central server 120 may receive a command from the mobile device 102A of a user to prevent resources from being provided by the supply outlet 140B for a particular time range. For example, the central server 120 may receive instructions from the mobile device 102A of a user to prevent water from being delivered by the supply outlet 140B between 1 AM to 8 AM when the user will not be trying to obtain water from the supply outlet 140B and is concerned that others may want to obtain water from the supply outlet 140B without the user's consent. The central server 120 may determine to provide a command to the gateway 130A based on the instructions. For example, the central server 120 may determine that it is now 1 AM and based on the instructions to prevent water from being delivered by the supply outlet 140B between 1 AM to 8 AM, determine to queue a command to the gateway 130A to provide the supply outlet 140B, where the command is to prevent resources from being delivered. The central server 120 may then provide the command in response to a request from the gateway 130A for orders. The gateway 130A may then provide the command to the supply outlet 140B in response to a request from the supply outlet 140B for orders for the supply outlet 140B. In response to receiving the command, the supply outlet 140B may then prevent resources from being delivered from the supply outlet 140B. The central server 120 may then determine at 8 AM to send a command to the gateway 130A to provide the supply outlet 140B, where the command is to enable resources to be delivered.

Figure 3:
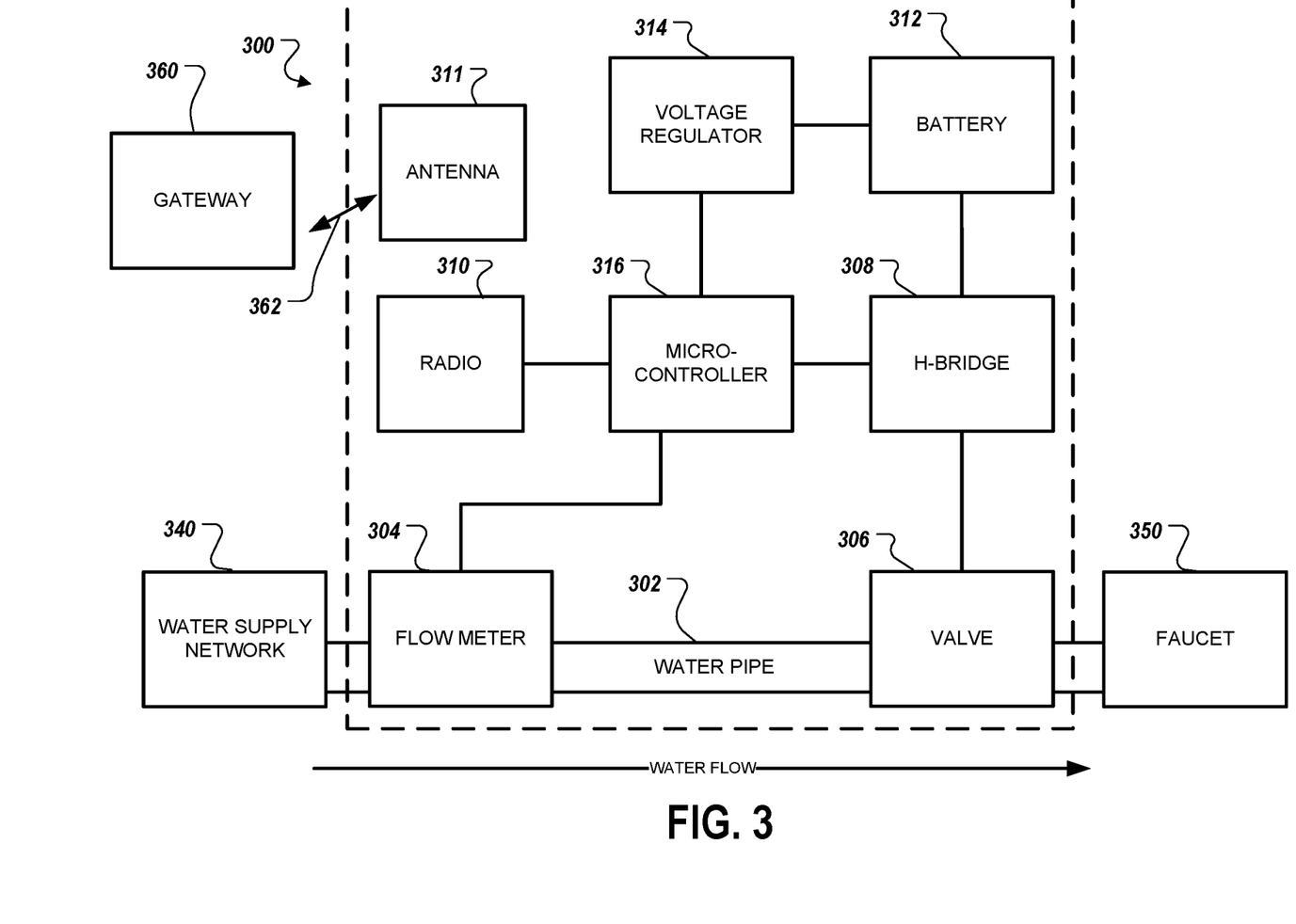
FIG. 3 is a block diagram of an example water meter for delivering water.

FIG. 3 is a block diagram of an example water meter 300 for delivering water. The water meter 300 may be an example implementation of the supply outlet 140 where the resource provided is water. Briefly, and as described in further detail below, the water meter 300 may include a flow meter 304, a valve 306, a H-Bridge 308, a radio 310, a battery 312, a voltage regulator 314, and a microcontroller 316. In some implementations, different configurations of the water meter 300 may be used. For example, the water meter 300 may not include the voltage regulator 314 or the flow meter 304 and valve 306 may be interchanged in order relative to the flow of water through the water pipe 302.

The flow meter 304 may measure an amount of water that flows through a water pipe 302 that receives water from a water supply network 340 and delivers water through a faucet 350. For example, the flow meter 304 may measure that one gallon of water from the water supply network 340 has flowed through the water pipe 302 and through the faucet 350. The amount of water that flows through the water pipe 302 may correspond to the amount of water that is delivered to a home through the faucet 350. For example, if one gallon of water flows through the water pipe 302, one gallon of water may be considered to have been delivered to a home.

In some implementations, the flow meter 304 may be a "paddle wheel" attached to a ring magnet diametrically magnetized, which rotates according to the flow of water passing through it. As the ring magnet rotates, the magnet may induce an alternating magnetic field, which may be sensed by a latching hall sensor located next to the wheel. The latching hall sensor may generate a square electric signal that is read by the microcontroller 316. In some implementations, other flow meters 304 that measure a flow of water may be used instead. For example, the magnet may be attached to a paddle of the "paddle wheel."

The valve 306 may control a flow of water through the water pipe 302. For example, the valve 306 may close to stop water from flowing through the water pipe 302 or may open to allow water to flow through the water pipe 302. The valve 306 may control the flow of water based on input from the H-Bridge 308. In some implementations, the valve 306 may be a latching solenoid valve, which can be opened or closed by a positive or negative electric pulse of a minimal duration, e.g., 20 ms, 30 ms, 50 ms, or some other duration. The latching aspect of the valve may mean the valve keeps an open/close status without consuming any power. The design of the valve used may mean backflow of water through the valve is very difficult, if not impossible.

The H-Bridge 308 may be a valve controlling circuit that allows the microcontroller 316 to provide enough current to the valve 306 to operate the valve 306. For example, the H-Bridge 308 may receive an instruction from the microcontroller 316 to open the valve 306, and in response, may generate a positive electric pulse of a minimal duration to open the valve 306.

The radio 310 may be a transceiver that enables communication between the water meter 300 and a gateway 360 over a wireless connection 362 that is not subject to cellular network charges. For example, the radio may be a sub GHz radio module. While any sub GHz frequency may be usable, the 434 MHz part of the ISM band may be used as it requires no radio license from authorities in many countries. The radio module may be attached to a quarter wavelength monopole antenna 311 and use Gaussian frequency-shift keying (GFSK) modulation to transmit data. Gateway 360 may be similar to gateways 130.

The battery 312 may be a power source that provides power to the water meter 300. For example, the battery 312 may be a set of four AA alkaline batteries that allows the water meter 300 to operate with no physical connection to any system besides the water pipe 302. In another example, the battery 312 may be two C alkaline batteries, a 9V battery, one or more camera batteries, or some other type of battery. The battery 312 may provide power to the H-Bridge 308. The voltage regulator 314 may receive power from the battery 312 and provide a stable voltage level to the microcontroller 316 and the radio 310.

The microcontroller 316 may control the water meter 300 based on communications with a gateway through the radio 310, monitoring flow readings from the flow meter 304, and instructing the H-Bridge 308 to control the valve 306. Generally, the microcontroller 316 may control the water meter 300 based on storing a maximum amount of water that may be provided by the water meter 300 that corresponds to the cumulative amount of water that orders from the gateway indicate have been prepaid, measuring the flow of water based on the flow meter 304, and keeping the valve 306 open while the amount of water that has flowed through the flow meter 304 is less than the maximum amount of water that may be provided by the water meter 300.

In some implementations, the microcontroller 316 may measure flow based on square electric signals from the flow meter 304. The flow meter 304 may emit a square electric signal, for which each "rising" edge (pulse) triggers an interrupt in the microcontroller 316. The microcontroller 316 may calculate a volume of water at each interrupt based on incrementing the volume between the last two pulses based on a function with an input of time elapsed between the pulses, where the function is non-linear and established through calibration of the device. All values may be counted using units small enough, e.g., microliters and microseconds, to allow integer-only calculations as integer calculations may be much faster than floating point calculations on microcontroller 316 without floating point units, which may eventually save power as the microcontroller 316 may remain active for shorter periods of time. The function may allow compensation for variations in the ratio flowrate/wheel rotation speed across a range of flowrates, e.g., flowrates covered by ISO 4064 or OIML R49. The calculated volume increments may be summed up into a periodic value (PV). The time elapsed between pulses may be several seconds, and the PV may be stored in microliters. At each interrupt from the flow meter 304, the volume increment may be added to PV.

A totalizing index may be maintained in the meter 304 in "meter reading units" which may equal 32,768 (or $2^{15}$) microliters each, a value which may allow fast binary computation and a wide range of values when stored as a 32 bit unsigned integer, e.g., up to $2^{32}*32.768$ ml or 140,737 m3 with a resolution of 32 ml, where usual meters can store values up to 99,999 m3 with a typical resolution of 50 ml. The totalizing index may correspond to total amount of water delivered by the water meter 300. At every period end, the microcontroller 316 may perform the following calculation: index increment=PV/32768 (rounded to the nearest inferior integer), index=previous index+index increment, and PV is set to PV−index increment. The calculation may be integer-only and allow transfer of all volumes counted without losses. A persistent memory (EEPROM) of the microcontroller 316 may be updated periodically with the total index so as not to lose data should a microcontroller 316 restart occur, expected or not.

In some implementations, the water meter 300 may manage energy consumption of the water meter 300. The water meter 300 may manage energy consumption based on turning off or depowering components of the water meter 300 when not needed. As fairly accurate timings to measure flow may be needed and the microcontroller 316 may be able to only track time accurately in shallow sleep modes, the following process may be used. If no flow has been sensed, e.g., no interrupts received from the flow meter 304 for more than X milliseconds (e.g., five thousand milliseconds) consider that water is not flowing, e.g., water_is_flowing=False, and go to deep sleep for a duration of SLEEP_TIME seconds (e.g., 10 seconds or some other length of time). If the end of the sleep period is reached without sensing any interrupt, deep sleep for another period. If deep sleep is interrupted by a pulse from flow meter 304, set water_is_flowing to True, switch to shallow sleep mode where time can be measured accurately for a short period of time, e.g., sixteen ms or some other length of time. If shallow sleep period elapses without interrupts, shallow sleep for a period of double the previous duration, until duration reaches a threshold, e.g., five seconds, beyond which it is safe to consider that water flow has stopped (then set water_isflowing to False). Switch to deep sleep in this case and revert back to beginning of the process. If shallow sleep is interrupted by a pulse, go back to shallow sleep for a minimal period of time, e.g., sixteen ms or some other duration.

In some implementations, all transmissions may be initiated by the water meter 300 and directed at a gateway. This may allow the microcontroller 316 of the water meter 300 to spend more time in deep sleep modes with the radio 310 turned off, hence saving power. To extend range, data may be transmitted at low bitrates, e.g., 1200 to 5000 bits/second, which may allow higher sensitivity on the receiving side. In some implementations, only very small data packets may be sent, which may contain a network identifier coded on 8 bit integer, a sender identifier coded on 8 to 16 bit integer, a recipient identifier coded on 8 to 16 bits bit integer, and a message type character coded on 8 bits, followed by a series of arguments whose length depends on the message type, e.g., an "r'" message is followed by 4 bytes, whose meaning is known to both sender and recipient code, e.g., a 32 bit unsigned integer representing the meter index in "meter reading units" described above. A node in the network may be uniquely identified by a pair (node identifier|network identifier).

In some implementations, a data transmission sequence may be as follows, always initiated by the meter side: Meter reports index to gateway with an 'r' message, gateway acknowledges reception to the meter 300, and gateway follows up by sending an order message, whose exact type depends on what has been requested from the central server. Examples of orders include "T" (topup), "C" (close valve), "O" (open valve), "X" (no order), and others. Similar to messages, orders may be followed by a known format of arguments. The water meter 300 may acknowledge each order by an agreed message, e.g.: a "b" (balance) message indicating a current maximum remaining amount of water that can be provided in response to a "T" order. An "X" order may close a dialog, at which point the water meter 300 may return to sleep and a gateway is free to exchange with another meter.

In some implementations, all transmissions can be attempted a number of times until acknowledgement is received, a timeout occurs or the maximum number of attempts, e.g., three, four, five, or some other number, is reached. If the transmission fails, the meter may store the information for later and go back to sleep. All radio transmissions may be encrypted using AES-256 or any other encryption algorithm.

Figure 4:
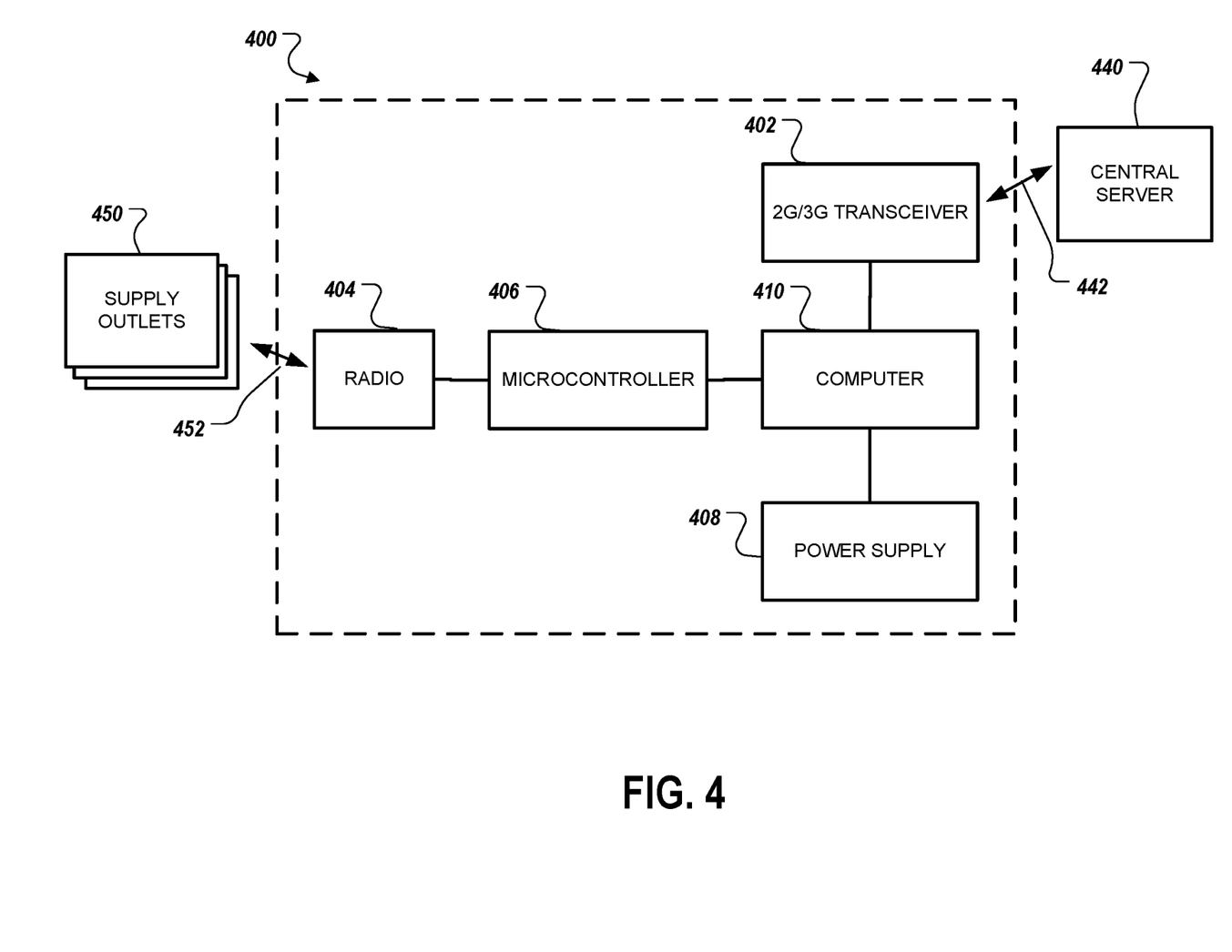
FIG. 4 is a block diagram of an example intermediate gateway.

FIG. 4 is a block diagram of an example intermediate gateway 400. The gateway 400 may include a 2G or 3G transceiver 402, a radio 404 and corresponding microcontroller 406, a power supply 408, and computer 410. In some implementations, different configurations of the intermediate gateway 400 may be used. For example, the intermediate gateway 400 may include multiple 2G or 3G transceivers 402 to deal with an unreliable network. The 2G/3G transceiver 402 may enable the gateway 400 to communicate with a central server 440 over a wireless connection 432 that incurs a cellular network charge. The central server 440 may be similar to central server 120. The radio 404 and corresponding microcontroller 406 may enable the gateway 400 to communicate with supply outlets 450 over a wireless connection 452, e.g., a wireless connection different than that for connecting to a central server 440 that does not incur a cellular network charge. The supply outlets 450 may be similar to the supply outlets 140 and the central server 440 may be similar to the central server 120. The power supply 408 may provide power to the gateway 400. For example, the power supply 408 may be a solar panel with batteries and charge management controller sized to provide uninterrupted power to the computer 410, day and night.

The computer 410 may be a device that manages communications between the central server 440 and supply outlets to transfer data between the supply outlets and central server, including when a 2G or 3G network is not available, in which case the computer 410 may store information for later dispatch. The computer 410 may use a persistence layer, e.g., a SQLite database, which allows storage and retrieval of structured data through querying, a serial link thread to communicate with the supply outlets, and a cloud link thread to communicate with the central server.

The serial link thread operating on the computer 410 may listen to the microcontroller 406 and the radio 404 through a serial port. The serial link thread may receive messages from the supply outlets as described above and store them in the persistence layer with a timestamp. In response to messages, the serial link thread may query the persistence layer for orders to send back to the supply outlet that just sent a message.

The cloud link thread may connect to the central server periodically to upload messages stored in the database. Upon successful upload of a message, a message may be removed from the persistence layer to avoid multiple uploads. Messages may be aggregated before uploading to limit protocol overhead. The list of messages may be packed into a JSON data structure such as [{message_identifier: 1, message_content: { . . . }}, . . . ]. Upon upload, the central server may send back a success message, or a list of identifiers that could not be saved. The cloud link may download, from the central server, new orders to be dispatched to supply outlets connected to this gateway. Orders received may be stored in the persistence layer for retrieval by the serial link thread. To obtain relevant orders, the gateway may send a unique identifier for the gateway. The central server may find orders for supply outlets that are linked to the gateway in the database, e.g., based on the unique identifier for the gateway. Similarly to messages, orders may be received by the gateway 400 in a single JSON data structure, which may allow efficient use of expensive bandwidth between the gateway 400 and a central server. The gateway 400 may confirm order execution to the central server, simply uploading a list of identifiers for orders and timestamps indicating when each order was processed by a supply outlet. Again, data may be packed in a JSON structure for efficiency reasons.

The persistence layer may be structured as follows. A message table with the following fields, a timestamp for the date/time at which the message was received from the supply outlet, the node and network identifier of the supply outlet, and the type of message received and its arguments, e.g., an index of the meter. An order table with the following fields, a unique order identifier obtained from the central server (for confirmation of order execution to the server), the node and network identifier of the supply outlet targeted by the order, the order type, the order arguments e.g., volume for topup orders, a "processed at" timestamp field, initially empty when the gateway receives the order from the central server, and set to local time upon receiving order execution confirmation from the supply outlet.

In some implementations, the resources delivered by a system may include delivering resources other than water. For example, the system 100 may provide for prepayment for use of items, e.g., trash cans, bicycles, ironing boards, street lights, where the items have meters that monitor and control their usage, and communicate over a wireless connection that does not incur a cellular network charge with a gateway, like described above, that in turn communicates with a central server, like described above, over a wireless connection that does incur a cellular network charge.

Embodiments of the subject matter, the functional operations and the processes described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a microcontroller, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, a thread, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data, generating output, or generating side effects. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program may include, by way of example, computers based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube), or LCD (liquid crystal display) monitor, or organic light-emitting diode (OLED) display, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet, a 3G network, an ISM band radio network, or other networks.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps may be provided, or steps may be eliminated, from the described processes. Accordingly, other implementations are within the scope of the following claims.

The invention claimed is:

1. An apparatus comprising:
a server system that controls water to be dispensed at water supply outlets to end users at distributed geographic locations, the server system comprising:
one or more processors that determine amounts of water for dispensing by the water supply outlets based on prepayment information of end users, the prepayment information being received from at least one electronic payment system,
wherein one of the one or more processors of the server system causes sending a command to one of the water supply outlets to cause the water supply outlet to dispense one or more of the amounts of water,
the server system being configured to receive the prepayment information as a message conforming to one or both of a short message service (SMS) format or a Transmission Control Protocol/Internet Protocol (TCP/IP) message via an application interface of the server system,
wherein the server system comprises an application interface configured to suggest, to one of the end users, how much water for the end user to request for dispensing based on information representative of prior amounts of usage of the water supply outlets.

2. The apparatus of claim 1, wherein the one of the one or more processors sends the command to the water supply outlet via an intermediate gateway.

3. The apparatus of claim 1, wherein the one of the one or more processors of the server system causes sending the command in response to receiving a request for dispensing one or more amounts of water.

4. The apparatus of claim 1, wherein the at least one electronic payment system comprises a mobile banking services account system, and the server system receives the prepayment information via the mobile banking services account system.

5. The apparatus of claim 1, wherein the server system comprises a cloud computing platform.

6. The apparatus of claim 1, wherein the at least one electronic payment system receives prepayment information comprising one or both of the short message service (SMS) format or the Transmission Control Protocol/Internet Protocol (TCP/IP) message via an application interface of the at least one electronic payment system.

7. The apparatus of claim 1, wherein the command includes an amount of water determined for dispensing at the water supply outlet.

8. The apparatus of claim 1, wherein the command includes a designation of a period of time for which no water is to be dispensed by the water supply outlet.

9. The apparatus of claim 1, wherein the one or more processors determine the amounts of water for dispensing by water supply outlets based on a pricing function for the water supply outlets that calculates an amount of water for dispensing at each of the water supply outlets for a monetary amount.

10. The apparatus of claim 1, wherein the prepayment information includes i) an identifier specifying the water supply outlet and ii) a transaction identifier.

11. The apparatus of claim 10, wherein the identifier specifying the water supply outlet specifies a mobile phone associated with the water supply outlet.

12. An apparatus comprising:
a server system that controls water to be dispensed at water supply outlets to end users at distributed geographic locations, the server system comprising:
one or more processors that determine amounts of water for dispensing by the water supply outlets based on prepayment information of end users, the prepayment information being received from at least one electronic payment system,
wherein one of the one or more processors of the server system sends a command to one of the water supply outlets to cause the water supply outlet to dispense one or more of the amounts of water,
wherein the at least one electronic payment system comprises a mobile banking services account system, wherein the server system receives the prepayment information via the mobile banking services account system
wherein the server system comprises an application interface configured to suggest, to an end user of the end user, how much water for the end user to request for dispensing based on information representative of prior amounts of usage of the water supply outlets.

13. The apparatus of claim 12, wherein the one or more processors send the command to the water supply outlet via an intermediate gateway.

14. The apparatus of claim 12, wherein each of the one or more processors send the command via an intermediate gateway in response to receiving a request from the intermediate gateway.

15. The apparatus of claim 12, wherein the at least one electronic payment system receives prepayment information comprising one or both of a short message service (SMS) format or a Transmission Control Protocol/Internet Protocol (TCP/IP) message via an application interface of the at least one electronic payment system.

16. The apparatus of claim 12, wherein the command includes an amount of water determined for dispensing at the water supply outlet.

17. The apparatus of claim 12, wherein the command includes a designation of a period of time for which no water is to be dispensed by the water supply outlet.

18. The apparatus of claim 12, wherein the one or more processors determine the amounts of water for dispensing by water supply outlets based on a pricing function for the water supply outlets that calculates an amount of water for distribution at each of the water supply outlets for a monetary amount.

19. The apparatus of claim 12, wherein the prepayment information includes i) an identifier specifying the water supply outlet and ii) a transaction identifier.

20. The apparatus of claim 19, wherein the identifier specifying the water supply outlet specifies a mobile phone associated with the water supply outlet.

21. The apparatus of claim 12, wherein the server system comprises a cloud computing platform.

22. The apparatus of claim 12, wherein the one of the one or more processors of the server system causes sending the command in response to receiving a request for dispensing one or more amounts of water.

* * * * *

UNITED STATES PATENT AND TRADEMARK OFFICE
CERTIFICATE OF CORRECTION

Page 1 of 1

PATENT NO. : 10,832,512 B2
APPLICATION NO. : 15/235729
DATED : November 10, 2020
INVENTOR(S) : Laurent Savaëte, Grégoire Auguste Landel and Miranda Phua It is certified that error appears in the above-identified patent and that said Letters Patent is hereby corrected as shown below:

In the Specification

Column 1, Line 2, below RESOURCE DELIVERY, insert:
-- CROSS REFERENCE TO RELATED APPLICATIONS
This application claims benefit of prior U.S. Provisional Application 62/210,541, filed on August 27, 2015, which is incorporated by reference in its entirety. --.

Signed and Sealed this
Sixth Day of July, 2021

Drew Hirshfeld
*Performing the Functions and Duties of the*
*Under Secretary of Commerce for Intellectual Property and*
*Director of the United States Patent and Trademark Office*